United States Patent [19]

Hon

[11] Patent Number: 4,865,689

[45] Date of Patent: Sep. 12, 1989

[54] METHOD AND APPARATUS FOR EVAPORATING THE VOLATILE COMPONENTS OF A POLYMER

[75] Inventor: Clarence C. Hon, Cherry Hill, N.J.

[73] Assignee: Mobil Oil Corporation, New York, N.Y.

[21] Appl. No.: 148,801

[22] Filed: Jan. 27, 1988

[51] Int. Cl.$^4$ .............................. B01D 1/22; B01D 3/04
[52] U.S. Cl. .................... 159/13.2; 159/27.4; 159/28.1; 159/49; 159/DIG. 10; 159/DIG. 16; 202/205; 202/236; 202/237; 203/89; 203/91; 165/115
[58] Field of Search ............... 159/5, 26.1, 27.4, 13.2, 159/23, 28.1, DIG. 10, DIG. 16, DIG. 32, 27.1, 49; 202/205, 237, 235, 236, 267.1; 165/177, 115; 203/89, 91; 122/39

[56] References Cited

U.S. PATENT DOCUMENTS

| | | | |
|---|---|---|---|
| 495,358 | 4/1893 | McCall | 165/177 |
| 726,193 | 4/1903 | Rust | 122/379 |
| 2,488,493 | 11/1949 | Evans | 422/131 |
| 2,709,642 | 5/1955 | Mann, Jr. et al. | 422/135 |
| 2,731,709 | 1/1956 | Gaddis et al. | 29/157.31 |
| 2,895,508 | 7/1959 | Drake | 138/38 |
| 3,149,056 | 9/1964 | Longstreth et al. | 202/236 |
| 3,192,184 | 6/1965 | Brill et al. | 526/71 |
| 3,198,241 | 8/1965 | Baird | 159/13.2 |
| 3,334,680 | 8/1967 | McManus | 159/13.2 |
| 3,358,422 | 12/1967 | Van Der Schee | 55/52 |
| 3,361,537 | 1/1968 | Ferrante | 159/DIG. 10 |
| 3,477,094 | 11/1969 | Maahs et al. | 159/13.2 |
| 3,620,283 | 11/1971 | Brown | 159/13.2 |
| 3,684,252 | 8/1972 | Nissle et al. | 366/168 |
| 3,779,712 | 12/1973 | Calvert et al. | 422/219 |
| 3,812,897 | 5/1974 | Latinen | 159/49 |
| 3,853,672 | 12/1974 | Gordon et al. | 159/17.3 |
| 3,928,300 | 12/1975 | Hagberg | 159/DIG. 10 |
| 4,153,501 | 5/1979 | Fink et al. | 159/13.2 |
| 4,367,331 | 1/1983 | Hager et al. | 528/501 |

FOREIGN PATENT DOCUMENTS

| | | | |
|---|---|---|---|
| 0648239 | 2/1979 | U.S.S.R. | 159/13.2 |
| 0698246 | 10/1953 | United Kingdom | 159/6.2 |
| 0748307 | 4/1956 | United Kingdom | 159/13.2 |
| 0830940 | 3/1960 | United Kingdom | 159/49 |

Primary Examiner—Virginia Manoharan
Attorney, Agent, or Firm—Alexander J. McKillop; Charles J. Speciale

[57] ABSTRACT

A device for removing the volatile components of a polymer in a polymer train includes a hollow pipe which defines an interior chamber, a pair of flanges mounted on opposite axial ends of the pipe, a heat jacket mounted on the pipe and disposed to surround the pipe, a plurality of band heating elements mounted on the outer peripheral surface of the heat jacket, and an arrangement of fin elements disposed in the interior chamber of the pipe to contact the polymer flowing through the pipe. Heat from the heating elements is distributed by the heat jacket over the axial length of the pipe and is transferred to the fin elements to heat the polymer flowing through the pipe. The fin elements may be in a cruciform arrangement within the interior chamber of the pipe. A method of removing the volatile components includes forming a thin film of polymer and heating and distributing the heat evenly on the thin film of polymer so that the volatile components may be vaporized. A vacuum is then created for removing the polymer and vaporized volatile components.

7 Claims, 2 Drawing Sheets

METHOD AND APPARATUS FOR EVAPORATING THE VOLATILE COMPONENTS OF A POLYMER

BACKGROUND OF THE INVENTION

1. Field Of The Invention

The present invention relates to an apparatus for evaporating or "stripping" the volatile components of a polymer, such as polystyrene or polyester, and more particularly relates to a partial evaporator unit which is employed as a devolatilizer for a polymer and a method of devolatilizing the polymer using the apparatus of the present invention.

It is conventional to use a devolatilizer at the end of a polymer train, that is, the series of apparatuses used in the process of making a polymer such as polystyrene. The devolatilizer is used to remove the volatile or lighter components of the polymer.

The volatile or lighter components of the polymer may consist of unconverted monomers, which are of low molecular weight and low viscosity. These monomers may be the result of an incomplete conversion process, or they may constitute lighter components of the polymer which has broken down to form monomers, which monomers may be different from the monomers used to make the polymer. Alternatively, in some polymer processes, it may be necessary to add a diluent to adjust the viscosity of the polymer. This diluent must be eventually removed.

The volatile or lighter components of the polymer are removed by a partial evaporator or devolatilizer. The lighter components are removed by evaporation, which is commonly referred to in the art as "stripping".

To help "strip" the lighter components from the polymer, one tries to maximize the force driving the lighter components from the liquid to the gaseous phase in the evaporation process. One way of accomplishing this is by using a pull vacuum situated at the end of the polymer train.

Another method used in combination with the pull vacuum is to provide heat to the polymer to maintain its high temperature, because as vapor is released, the vapor takes heat with it from the polymer and the polymer cools down and becomes very viscous. A heat source is used and is disposed in thermal contact with the polymer to maintain its high temperature.

Also, it is desirable to increase the inter-surface contact area between the polymer and the heat source so as to increase the heat transfer rate or the amount of heat transferred from the heat source to the polymer.

It is also important to make it easy for the molecules of the lighter components to migrate to the surface of the polymer where they may change to a vapor phase. Therefore, one would make the polymer into a thin film, which is advantageous for mass transfer.

OBJECTS AND SUMMARY OF THE INVENTION

It is an object of the present invention to provide a devolatilizer which removes and releases the volatile components of a polymer to low concentrations and which exhibits a high heat transfer rate and a low pressure drop.

It is a further object of the invention to provide a method for devolatilizing a polymer through the application of even heating and with a resultant low pressure drop.

In accordance with the present invention, an apparatus for removing the volatile components of a polymer constructed in accordance with the present invention includes a hollow tubular pipe having opposite top and bottom open axial ends and defining an interior chamber. The tubular pipe includes first and second flanges mounted on the opposite open axial ends of the pipe. Tee first flange is coupled to a lead conduit supplying polymer under pressure to the devolatilizer. The second flange is coupled to a vacuum chamber by a discharge conduit.

The first flange has an orifice or opening formed through its thickness so that the lead conduit is in communication with the interior chamber of the tubular pipe. The orifice is preferably smaller than the interior diameter of the lead conduit so as to maintain a constant back pressure to the rest of the polymer train upstream from the devolatilizer. The second flange surrounds the bottom open axial end of the pipe so that the interior chamber of the pipe is in communication with the vacuum chamber through the pipe's bottom open end.

An arrangement of fin elements, each being in the form of a plate-like member, is disposed in the pipe chamber. Each fin element is in contact with the interior surface wall of the pipe so that heat from the pipe can be transferred by conduction to the fin elements. The fin elements may be disposed in a variety of configurations, for instance, as a cruciform. In any event, the fin elements define a series of passages in the devolatilizer pipe for the polymer to flow through as it passes through the devolatilizer.

A heat jacket, preferably formed as two mating half jacket members, surrounds the tubular pipe in contact with the outer wall of the pipe. A plurality of discrete band heaters are mounted closely on the outside of the heat jacket. The heat jacket evenly distributes the heat given off or generated by the band heaters over the full axial length of the pipe.

The particular configuration of the devolatilizer described above allows the polymer to form a thin film on the fin elements and on the interior wall of the tubular pipe as the polymer flows through the devolatilizer. The heat from the band heaters conducts to the fin elements and evenly heats the thin film of polymer. This causes the volatile components of the polymer to evaporate. The polymer and the gases given off by the polymer enter the vacuum chamber where the polymer is collected. The gases escape through a vent which may be provided in the top of the vacuum chamber.

These and other objects, features and advantages of this invention will become apparent from the following detailed description of illustrative embodiments thereof, which is to be read in connection with the accompanying drawings.

BRIEF DESCRIPTION OF THE DRAWINGS

FIG. 5 is a sectional view of an alternate embodiment of the devolatilizer of the present invention as shown in FIG. 2.

DETAILED DESCRIPTION OF THE PREFERRED EMBODIMENTS

Figure 1:
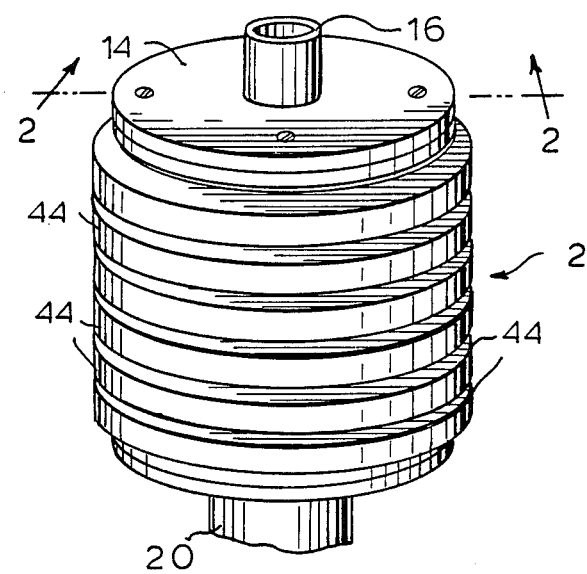
FIG. 1 is an isometric view of the devolatilizer of the present invention.

Referring now to the drawings, it will be seen that a devolatilizer 2 constructed in accordance with the present invention basically includes a hollow tubular pipe or cylinder 4 having opposite top and bottom open axial ends. The pipe 4 in its preferred form is made out of a 1 inch sch. 40 pipe, and is approximatelY 15 inches in length. Of course, the actual size of the pipe will depend on the heat transfer characteristics of the devolatilizer, the polymer viscosity and the volatile content of the polymer which must be removed. Its size will also vary with other process conditions. The pipe 4 may be formed from a stainless steel or other material, such as aluminum. The tubular pipe defines a chamber 6 in its interior.

First and second flanges 8, 10 are mounted on the opposite top and bottom open axial ends of the tubular pipe 4, respectively. The flanges 8, 10 are preferably circular and have a diameter which is greater than that of the tubular pipe so that the flanges extend radially beyond the periphery of the pipe. The flanges 8, 10 are integrally formed with the pipe 4 or are joined to the pipe by welding or other methods so that fluidtight seals are formed at their connection with the pipe.

The first flange 8 is coupled by fasteners 12 or other means to a mating flange 14 of a lead conduit 16 supplying polymer under pressure to the devolatilizer. The second flange 10 is coupled to a mating flange 18 of a discharge conduit 20, also by fasteners 22, and to a vacuum chamber 24, as will be described, through the discharge conduit.

The first flange 8 has an orifice or opening 26 formed through its thickness so that the lead conduit 16 is in communication with the interior or chamber 6 of the tubular pipe. The orifice 26 is preferably formed with a diameter that is less than the interior diameter of the lead conduit 16 so as to maintain a constant back pressure to the rest of the polymer train. In an alternative embodiment shown in FIG. 5, the mating flange 14 of the lead conduit may be formed with an orifice 29 having a smaller diameter than the inner diameter 30 of the lead conduit 16. The size of the orifice of the first flange 8 is formed to be between about 1/16th inch and ¼ inch in diameter, depending on the viscosity of the polymer and the throughput (i.e., the velocity at which the polymer travels through the devolatilizer).

The second flange 10 differs from the first flange in that it does not define a smaller orifice as in the first flange, in order to reduce the pressure drop in the devolatilizer. Rather, the second flange basically surrounds the bottom open axial end of the tubular pipe so that the pipe's bottom open end and interior chamber are in communication with the vacuum chamber 24 through the discharge conduit. Like the pipe 4, the flanges 8, 10 may be formed from stainless steel or aluminum. Also, upon the polymer entering and passing through the pipe 4 of the devolatilizer, the polymer undergoes a pressure reduction from a pressure to a vacuum, which is created inside pipe 4 by vacuum chamber 24.

An arrangement of fin elements 32, each being in the form of a plate-like member, is disposed in the pipe chamber 6. Each fin element 32 is in contact with the interior surface walls of the pipe 4 so that heat from the pipe can be transferred by conduction to the fin elements.

Figure 2:
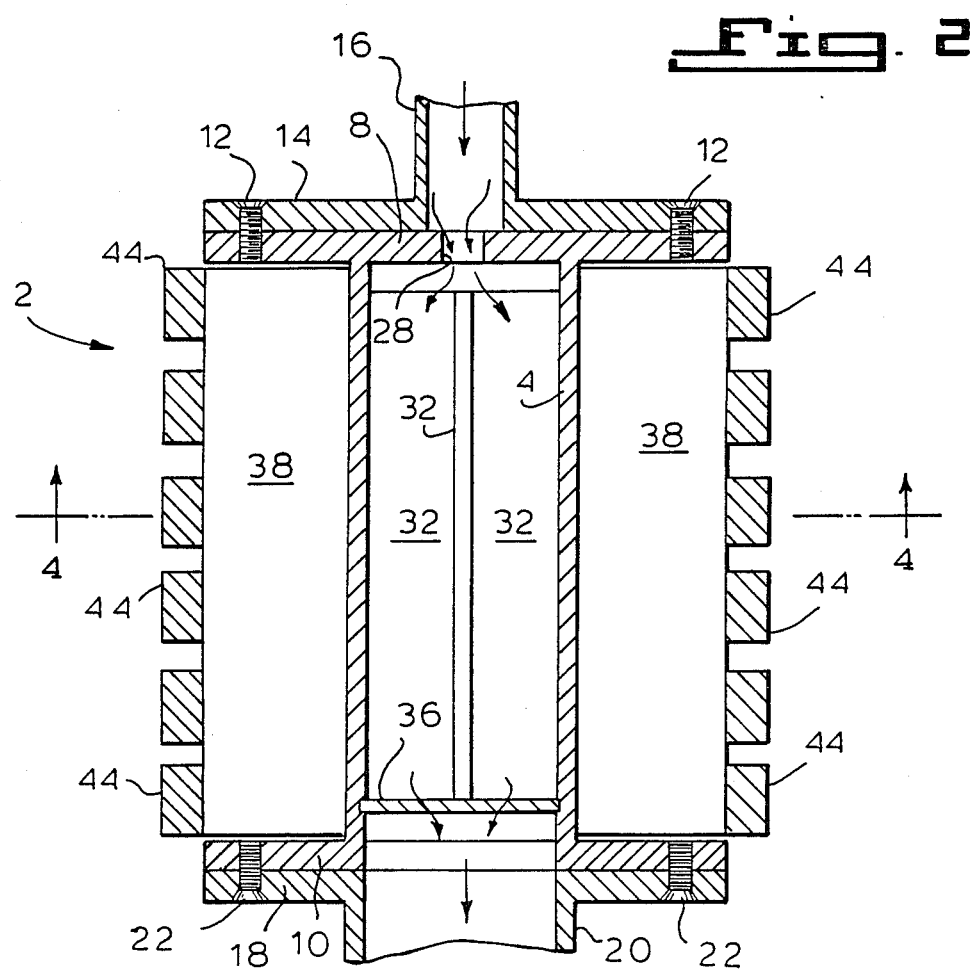
FIG. 2 is a sectional view of the devolatilizer shown in FIG. 1, taken along line 2—2 of FIG. 1.
Figure 3:
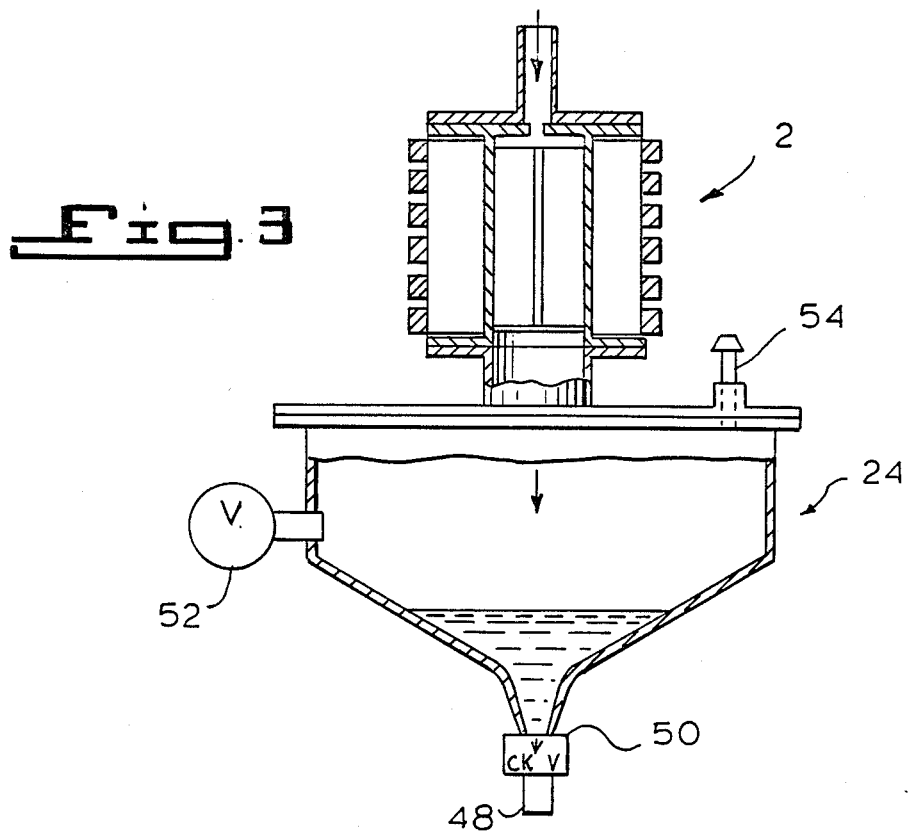
FIG. 3 is a diagrammatic representation of the devolatilizer of the present invention shown connected to a vacuum chamber.
Figure 4:
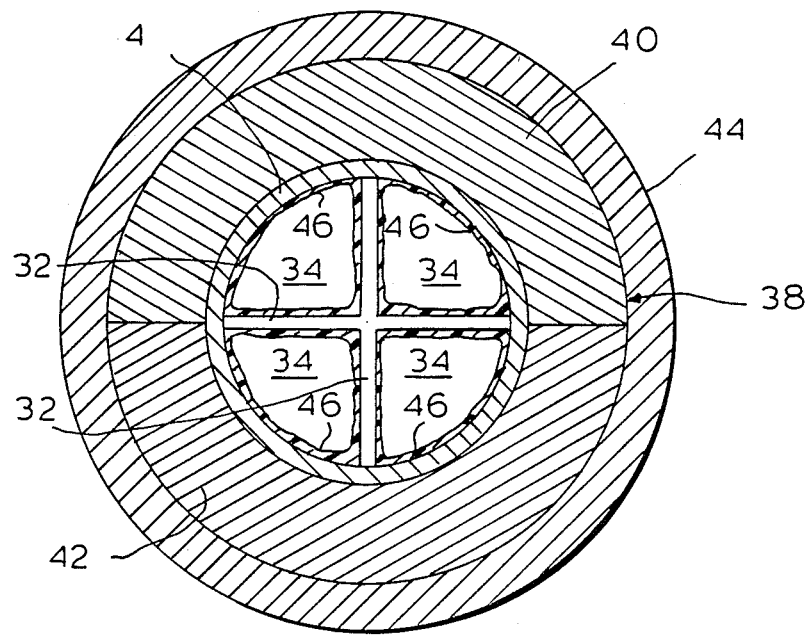
FIG. 4 is a sectional view of the devolatilizer shown in FIG. 2, taken along line 4—4 of FIG. 2.

As illustrated in FIGS. 2 and 4 in particular, the fin elements 32 may be disposed in a variety of configurations. In their preferred form, a pair of intersecting fin elements that are perpendicular to each other so as to be in a cruciform arrangement are provided, although other arrangements may be suitable. As shown in FIGS. 2 and 4 the arrangement of fin elements 32 are fixedly disposed and oriented along the axial direction of the interior chamber of the pipe 4.

The fin elements 32 are preferably formed from aluminum or other material, and are about ⅛ inch in thickness. As will be seen, the aluminum fin elements provide a path for heat transfer to the polymer flowing through the devolatilizer to effect the devolatilization of the polymer. Although the fin elements 32 may be arranged in various configurations, they define a series of passages or channels 34 in the devolatilizer pipe 4 for the polymer to flow through as it passes through the devolatilizer.

The fin elements 32 are slightly spaced from the first and second flanges 8, 10 so that the polymer flowing through the channels 34 which they define may flow through the orifice formed in the first, flange 8, through the channels 34 of the fin element arrangement and out the orifice formed in the second flange 10. The fin elements 32 may be welded to the inside surface of the tubular pipe, or they may be fitted in the pipe unsecured to but in contact with the inside surface of the pipe. Accordingly, in this latter form of the invention, the fin elements 32 may rest on a crosswire 36 which extends diametrically across the inside of pipe 4 and is welded to the inside wall of the pipe. The crosswire 36 is preferably ⅛ inch in diameter, and is formed from a stainless steel or other material.

A heat jacket 38 surrounds the tubular pipe 4 and is disposed in contact with the outer wall of the pipe. The heat jacket 38 is preferably formed as two mating half jacket members 40, 42 that are mounted together. The heat jacket 38 is formed from a bronze-aluminum alloy material.

A plurality of discrete band heaters 44 are mounted closely on the outside peripheral surface of the heat jacket 38 and are spaced apart from each other in the axial direction of the pipe 4. The band heaters 44 provide heat to the devolatilizer, and have a total capacity which is about 1 kilowatt in a preferred form of the devolatilizer. Such band heaters are well known in the art and may be purchased from Chromalox Corp. or Watlow Company, for example. The heat from the band heaters 44 is transferred to the heat jacket 38, which distributes the heat evenly over the full axial length of the pipe. Of course, other types of discrete heaters may be used, such as hot oil type heaters, to provide heat to the devolatilizer.

The configuration of the devolatilizer described above allows the polymer 46 to form a thin film on the fin elements 32 and on the interior walls of the tubular pipe 4 as the polymer flows through the devolatilizer, as illustrated by FIG. 4., The heat from the band heaters 44 conducts to the fin elements 32 and evenly heats the thin film of polymer 46. The heat helps cause the volatile components of the polymer to evaporate and maintains the polymer at an elevated temperature, which helps the polymer flow. Both the gas given off during the devolatilization of the polymer and the devolatilized polymer enter the vacuum chamber 24.

The vacuum chamber 24 is basically a hopper which stores or collects the polymer 46. The chamber 24 includes an outlet conduit 48 and a valve 50 for removing a quantity of polymer from the vacuum chamber. The chamber 24 is connected to a vacuum source 52. The vacuum created in the vacuum chamber helps draw the polymer as well as the devolatilized polymer vapors through the devolatilizer. A vent 54 may be provided and formed in the upper surface of the vacuum chamber 24 and connected to a vacuum source (not shown) to draw off the polymer vapors from the chamber.

The present invention provides several advantages over known methods and evaporators used in polymer processing trains. The particular configuration of the devolatilizer described above provides good heat transfer from the band heaters to the polymer. Also, the polymer as it passes through the devolatilizer forms into a thin film. The thin film of polymer formed by the particular structure of the present invention enhances the ability of the invention to devolatilize the polymer by allowing a greater quantity of volatile components to escape through the polymer at a greater rate.

Also, the particular configuration of the devolatilizer described above provides little resistance to polymer flow, thereby allowing the polymer to flow with a high linear velocity through the devolatilizer. In addition, because the devolatilizer of the present invention keeps the polymer flowing in a thin film through the devolatilizer and maintains the temperature of the polymer, it minimizes the accumulation and degradation of polymer material in the devolatilizer, which accumulated and degraded polymer material has been known to clog conventional partial evaporators.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. Apparatus for removing the volatile components of a polymer, the apparatus comprising: a lead conduit having diameter;
    a hollow pipe defining an interior chamber having an axial direction through which the polymer passes, the hollow pipe having interior wall and opposite top and bottom open axial ends;
    means for forming an orifice at said top open axial end of said hollow pipe, said orifice having an inner diameter being less than said diameter of said lead conduit so as to provide a back pressure in said conduit;
    a heat jacket mounted on the pipe and disposed in surrounding relationship thereto;
    heating means mounted on the outer peripheral surface of the heat jacket;
    an arrangement of fin elements fixedly disposed and oriented along the axial direction of the interior chamber of the pipe so as to contact the polymer flowing therethrough and form a thin film of polymer on said fin elements and on said interior walls of said pipe as said polymer flows through said pipe, wherein said fin elements are thermally coupled to the pipe so that heat from the heating means is distributed by the heat jacket over the axial length of the pipe and so that heat is transferred to the fin elements to heat the thin polymer film flowing through the pipe to vaporize the volatile components of said polymer, and means for removing said volatile components of the polymer from said interior chamber of said pipe.

2. The apparatus as defined by claim 1, wherein the fin elements are in a cruciform arrangement.

3. An apparatus as defined by claim 1, wherein the heat jacket is formed as a pair of mating half jacket members which are mounted together.

4. An apparatus as defined by claim 1, wherein the apparatus further includes a crosswire disposed in the interior chamber of pipe to support the arrangement of fin elements.

5. An apparatus as defined by claim 1, wherein the heat jacket is formed from a bronze - aluminum alloy material.

6. An apparatus as defined by claim 1, wherein said means for removing said volatile components of the polymer comprises a vacuum chamber, the vacuum chamber is in communication with the interior chamber of the pipe.

7. A method of removing the volatile components of a polymer in a polymer train, said method comprising the steps of: using an apparatus having a lead conduit;
    providing a polymer to the lead conduit;
    passing said polymer from the lead conduit to a hollow pipe, said pipe, defining an interior chamber having an axial direction and an arrangement of fin elements fixedly disposed in and oriented along said axial direction of the interior chamber, said fin elements are thermally coupled to a heating means by a heating jacket and said hollow pipe, so that a thin film of polymer is formed on the fin elements and on the interior walls of the hollow pipe as said polymer flows through said interior chamber of said hollow pipe;
    heating the polymer and distributing the heat on the thin film of polymer to vaporize the volatile components of the polymer, the heat is provided by said heating means, and the heat from the heating means is distributed by said heat jacket mounted on the hollow pipe and disposed in surrounding relationship thereto, the heating means is mounted on the outer peripheral surface of the heat jacket, the heat from the heating means is distributed by the heat jacket over the axial length of the pipe is transferred to the fin elements to heat the polymer flowing through the pipe; passing said polymer and volatile components of said polymer to a vacuum means, the polymer undergoes a pressure reduction from a pressure to a vacuum upon said polymer entering and passing through said interior chamber, said vacuum is formed by the vacuum means, said vacuum means is in connection with said interior chamber of said hollow pipe; and
    removing the polymer and vaporized volatile components from said vacuum means.

* * * * *